United States Patent [19]

Katoh

[11] 4,133,175
[45] Jan. 9, 1979

[54] INTERNAL COMBUSTION ENGINE EQUIPPED WITH IMPROVED SECONDARY AIR SUPPLY SYSTEM

[75] Inventor: Kazumasa Katoh, Yokohama, Japan

[73] Assignee: Nissan Motor Company, Ltd., Japan

[21] Appl. No.: 771,662

[22] Filed: Feb. 24, 1977

[30] Foreign Application Priority Data

Feb. 26, 1976 [JP] Japan .................................. 51-21089

[51] Int. Cl.² .............................................. F01N 3/10
[52] U.S. Cl. ........................................ 60/293; 60/305; 60/306
[58] Field of Search ................. 60/282, 293, 304, 305, 60/306

[56] References Cited

U.S. PATENT DOCUMENTS

| | | | |
|---|---|---|---|
| 2,263,318 | 11/1941 | Tifft | 60/306 |
| 3,630,021 | 12/1971 | Bishop | 60/293 |
| 3,662,541 | 5/1972 | Sawada | 60/293 |
| 4,031,699 | 6/1977 | Suga | 60/282 |

Primary Examiner—Douglas Hart

[57] ABSTRACT

An internal combustion engine employing a siamesed exhaust port arrangement is equipped with a secondary air supply system which is arranged to induct atmospheric air into the exhaust system of the engine in response to the pressure pulsation in the exhaust port. At least two air injection nozzles are disposed open to portions of the exhaust port where they are not affected by the interaction of the pressure pulsations caused by the strokes of two adjacent engine cylinders.

10 Claims, 11 Drawing Figures

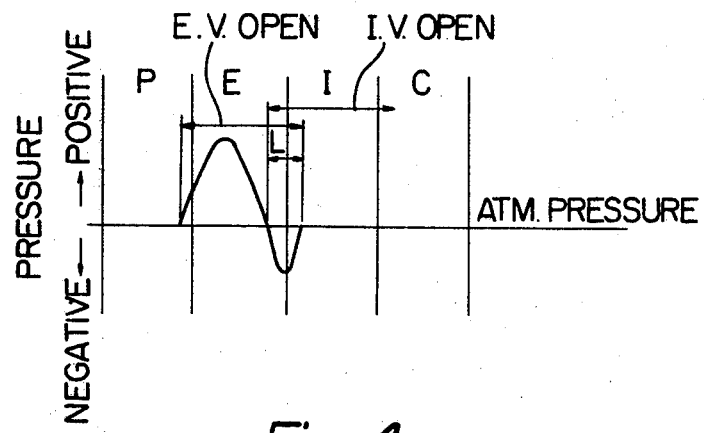
Fig. 3 PRIOR ART
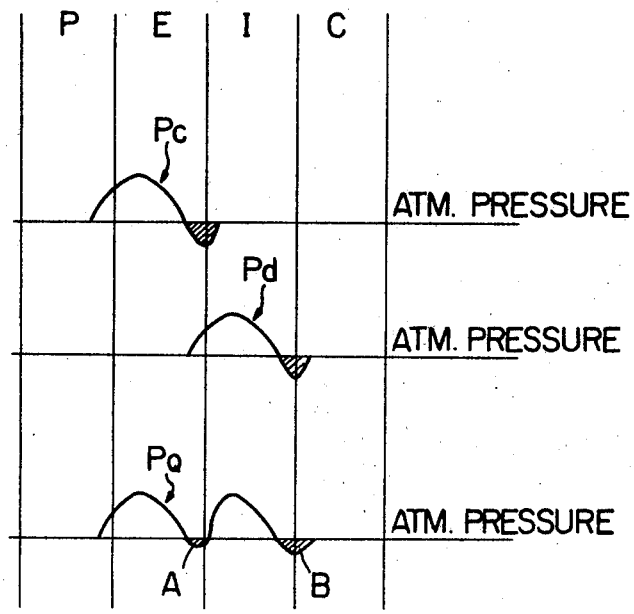
Fig. 4 PRIOR AIR

INTERNAL COMBUSTION ENGINE EQUIPPED WITH IMPROVED SECONDARY AIR SUPPLY SYSTEM

This invention relates, in general, to an internal combustion engine equipped with a secondary air supply system for supplying its exhaust system with air by the effect of pulsation of the pressure in the exhaust system, and more particularly to the arrangement of the air injection nozzles of the secondary air supply system in a combined exhaust port which is shared by two adjacent engine cylinders.

It is the prime object of the present invention to provide an improved internal combustion engine capable of supplying its exhaust system with sufficient air for reburning the exhaust gases discharged from the combustion chambers of the engine throughout all engine operating conditions.

Another object of the present invention is to provide an improved internal combustion engine having a so-called siamesed exhaust port arrangement, and a secondary air supply system for supplying its exhaust system with air in response to the pressure pulsation in the exhaust system, in which the shortage of air supplied to the exhaust system does not occur in spite of the fact that the vacuum for inducting air is weakened in the siamesed exhaust port by the interaction of the pressure pulsations of the adjacent two cyliners of the engine.

A further object of the present invention is to provide an improved secondary air supply system which is arranged to induct air into the exhaust system of an internal combustion engine using a so-called siamesed exhaust port arrangement, in which at least two air injection nozzles of the secondary air supply system are disposed so as to open into portions of the exhaust port which are not affected by the interaction of the pressure pulsations caused by adjacent two cylinders of the engine.

Other objects, features, and advantages of the engine according to the present invention will become more apparent from the following description in conjunction with the accompanying drawings in which like parts and matters are designated by like reference numerals and characters throughout all the drawings, in which:

FIG. 3 is a graph showing the pressure variation in the exhaust port adjacent the exhaust valve of the engine of FIG. 1;

FIG. 4 is a graph showing the pressure variations in the siamesed exhaust port of the engine of FIG. 1;

It is well known in the art that atmospheric air is inducted through a one-way valve into the exhaust system of an internal combustion engine when the vacuum is generated in the exhaust system utilizing the effect of pressure pulsation generated in the exhaust gas passage leading from the combustion chamber of the engine. This pressure pulsation will be referred to as "exhaust pulsation" hereinafter. The atmospheric air supplied to the exhaust system serves to promote the oxidation reaction of the unburned constituents contained in the exhaust gases from the combustion chamber, and accordingly is called, in general, "secondary air."

A secondary air supply device according to the above offers, for example, the following advantages: an air pump for pressurizing atmospheric air and a pressure relief valve for same are not necessary since the amount of secondary air in this secondary air supply device is decreased during high load engine operation at which a large amount of secondary air is not required. However, this secondary air supply device has encountered difficulties in that the amount of secondary air is short or insufficient during normal engine operation. This shortage of secondary air amount is particularly notable in engines using a so-called siamesed exhaust port arrangement in which two exhaust ports respectively connected to two adjacent cylinders are combined to form one outlet opened to one side of a cylinder head, in other words, the two cylinders share one exhaust port. Because, the exhaust pulsations from the two adjacent cylinders interfere or interact with each other to weaken the vacuum in the exhaust system when the exhaust gases from the adjacent two cylinders meet in the siamesed exhaust port. It is to be noted that the atmospheric air is inducted by the effect of this vacuum in the exhaust system.

Figure 1:
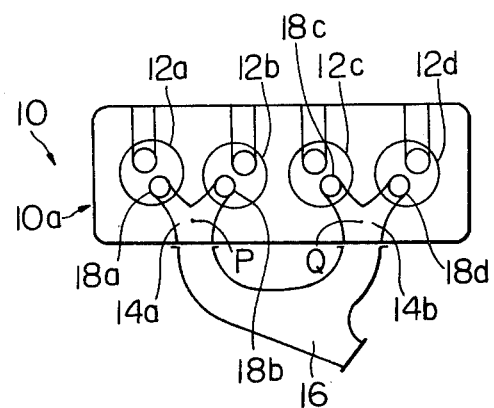
FIG. 1 is a schematic illustration of a prior art internal combustion engine using a siamesed exhaust port arrangement.

The above-mentioned manner for supplying the secondary air into the exhaust system will be further explained in detail hereinafter with reference to FIGS. 1 to 4. FIG. 1 shows a conventional engine 10 having an engine proper 10a which is formed with four cylinders 12a to 12d. As shown, the two cylinders 12a and 12b share a siamesed exhaust port 14a, and other two cylinders 12c and 12d share the other siamesed exhaust port 14b. The siamesed exhaust ports 14a and 14b communicate with an exhaust manifold 16 forming part of an exhaust system of the engine. The reference numerals 18a to 18b indicate exhaust valves disposed respectively in the cylinders 12a to 12d.

Figure 2:
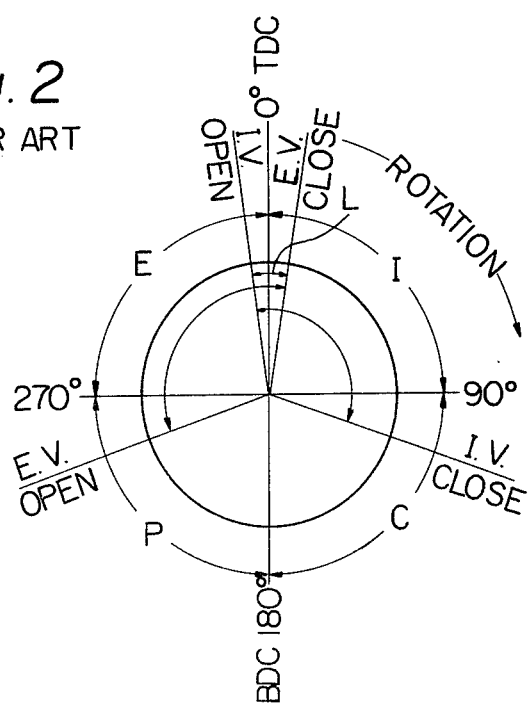
FIG. 2 is a diagram showing the valve timing of the prior art engine of FIG. 1.

In general, the valve timing of the intake and exhaust valves disposed in each cylinder is arranged to have a so-called valve overlap, indicated by L in FIGS. 2 and 3, at which both the intake valve (I.V.) and exhaust valve (E.V.) open. In FIG. 2, the letters "I," "C," "P" and "E" represent intake stroke, compression stroke, power stroke and exhaust stroke, respectively. These letters will be used in FIGS. 3 and 4 hereinafter. The degrees of angles in FIG. 2 represent crank angles of the engine. Accordingly, the pressure in the exhaust port adjacent to the exhaust valve varies as shown in FIG. 3.

These phenomena results from the fact that the pressure (positive pressure) in the exhaust port adjacent the exhaust valve increases when the exhaust valve opens, and the vacuum (negative pressure) is generated in the exhaust port adjacent the exhaust valve during the valve overlap L, indicated in FIGS. 2 and 3, at which the exhaust port is supplied with the vacuum generated due to the descent movement of a piston reciprocally movably disposed in the cylinder.

When the firing order is set to 12a-12c-12d-12b in the reciprocating-piston, four stroke cycle, four cylinder engine shown in FIG. 1, the strokes amoung four cylinders are represented in Table 1 mentioned below.

Table 1

| cylinder | order of strokes | | | | |
|---|---|---|---|---|---|
| 12a | P | E | I | C | P |
| 12b | E | I | C | P | E |
| 12c | C | P | E | I | C |
| 12d | I | C | P | E | I |

I = induction stroke
C = compression stroke
P = power stroke
E = exhaust stroke

In this case, the pressure at a position Q, shown in FIG. 1, in the exhaust port 14b varies as shown in FIG. 4 in which the pressures at portions of the exhaust port 14b adjacent the cylinders 12c and 12d vary as indicated by curves $P_c$ and $P_d$, respectively; accordingly at pressure at the position Q in the exhaust port 14b varies as indicated by a curve $P_q$ which is obtained by composing the two curves $P_c$ and $P_d$. It will be understood that the pressure variation at a position P in the other siamesed exhaust port 14a is similar to the above-mentioned siamesed exhaust port 14b through not shown.

As seen from FIG. 4, the interference or interaction between the exhaust pulsations of the adjacent two cylinders 12c and 12d occurs at the terminal period of the exhaust stroke to decrease the vacuum as indicated by a portion A in FIG. 4. As a result, the amount of the secondary air inducted into the exhaust system is decreased causing shortage of the secondary air required for promoting oxidation reaction of the unburned constituents contained in the exhaust gases. Whereas, the vacuum generated between the induction and compression strokes is maintained as indicated by a portion B in FIG. 4.

In order to prevent the shortage of the secondary air, it may be proposed to enlarge the sizes or the cross-sectional area of a nozzle for injecting air into the exhaust system and a secondary air supply pipe connecting the nozzle and atmospheric air. However, by doing the same, the flow resistance of the exhaust gases passing through the exhaust port is increased to increase the back pressure to the cylinder. Additionally, the secondary air supply pipe and the one-way valve connected thereto may be subjected to thermal damage when a positive pressure is generated in the exhaust port and a portion of the exhaust gases is admitted through the secondary air injection nozzle into the secondary air supply pipe and the one-way valve.

In view of the above, the present invention contemplates to prevent the shortage of the secondary air supplied to the exhaust system of the engine employing the siamesed exhaust port arrangement and the device for inducting the secondary air into the exhaust system by the effect of exhaust pulsation, without the drawbacks encountered in prior art engines. This is achieved by disposing at least two secondary air injection nozzles air portions of the siamesed exhaust port which are not affected by the interaction of the different characteristics of exhaust pulsations caused by the adjacent two cylinders.

Figure 5:
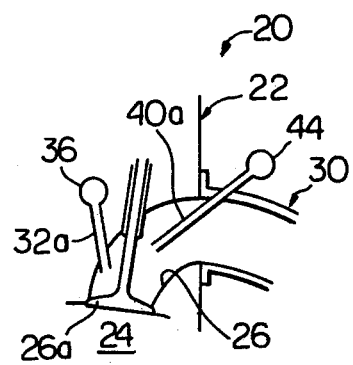
FIG. 5 is a schematic vertical section view of the cylinder head of a preferred embodiment of an internal engine in accordance with the present invention.
Figure 6:
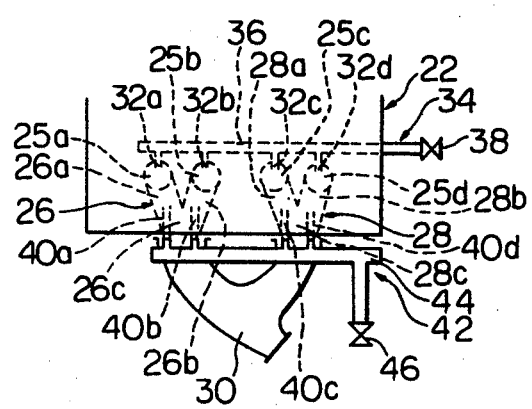
FIG. 6 is a schematic plan view of the engine of FIG. 5.
Figure 7:
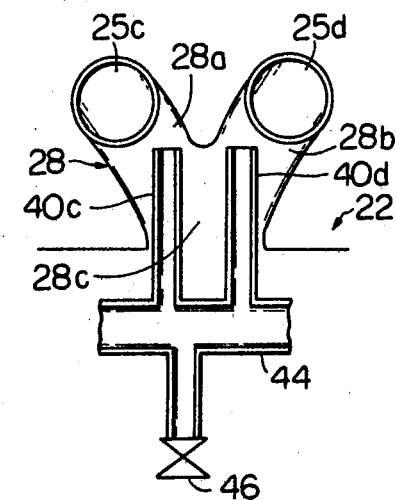
FIG. 7 is a schematic section view showing the location of the nozzles of a secondary air supply system in a siamesed exhaust port of the engine of FIG. 5.

Referring now to FIGS. 5 to 7, a preferred embodiment of a reciprocating-piston, four stroke cycle, in-line internal combustion engine 20 in accordance with the present invention is shown as including an engine proper (no numeral) having a cylinder head 22. The cylinder head 22 defines the top portions of four combustion chambers 24 (only one combustion chamber shown in FIG. 5). The cylinder head 22 is formed with two siamesed exhaust ports 26 and 28. The siamesed exhaust port 26a is composed of two upstream portions 26a and 26b which are connectable respectively to the adjacent two combustion chambers through exhaust valves 25a and 25b. The two upstream portions 26a and 26b are combined to form one downstream portion 26c which opens to one side of the cylinder head 22. The other siamesed exhaust port 28 is similarly composed of two upstream portions 28a and 28b connectable respectively through exhaust valves 25c and 25d to the adjacent two combustion chambers, and a downstream portion 28c opened to the one side of the cylinder head 22. The downstream portions 26c and 28c of the siamesed exhaust ports 26 and 28 connect to an exhaust manifold 30 forming part of the exhaust system of the engine. The exhaust manifold 30 is secured to one side of the cylinder head 22.

Four secondary air injection nozzles 32a to 32d forming part of a first secondary air supply system or means 34 are respectively opened to upstream portions 26a, 26b, 28a and 28b of the siamesed exhaust ports 26 and 28 and adjacent the exhaust valves 25a to 25d. The air injection nozzles 32a to 32d are connected to a secondary air passage 36 formed in the cylinder head 22. The air passage 36 is communicable through a one-way valve 38 with atmospheric air. The one-way valve 38 is arranged to open to induct therethrough atmospheric air into the exhaust ports 26 and 28 through the air passage 36 and the air injection nozzles 32a to 32d when each of the pressures at portions where the air injection nozzles 32a to 32d open is below atmospheric pressure, and to close when each of the pressures at the same portions is above atmospheric pressure.

With this first secondary air supply system 34, the atmospheric air is inducted through each secondary air injection nozzles 32a, 32b, 32c and 32d into the corresponding exhaust port upstream portion adjacent to the exhaust valve when a vacuum is generated in the upstream portion of the exhaust port, and of course is not inducted into the exhaust port upstream portion when the vacuum is not generated.

The reference numerals 40a, 40b, 40c and 40d represent respectively four secondary air injection nozzles which form part of a second secondary air supply system or means 42. The secondary air injection nozzles 40a and 40b open to the upstream portions 26a and 26b of the siamesed exhaust port 26, respectively. Similarly, the secondary air injection nozzles 40c and 40d open to the upstream portions 28a and 28b of the siamesed exhaust port 28, respectively, as best seen in FIG. 7. The four secondary air injection nozzles communicate with a secondary air passage 44 or a secondary air conduit which is communicable through a one-way valve 46 with atmospheric air. The one-way valve 46 is arranged similarly to that of the first secondary air supply system 34. While the secondary air injection nozzles 40a to 40d of the second secondary air supply system 42 are shown and described to be opened to the upstream portions of the siamesed exhaust port, they may be opened to the downstream portion 26c and 28c of the siamesed exhaust ports 26 and 28.

Figure 8:
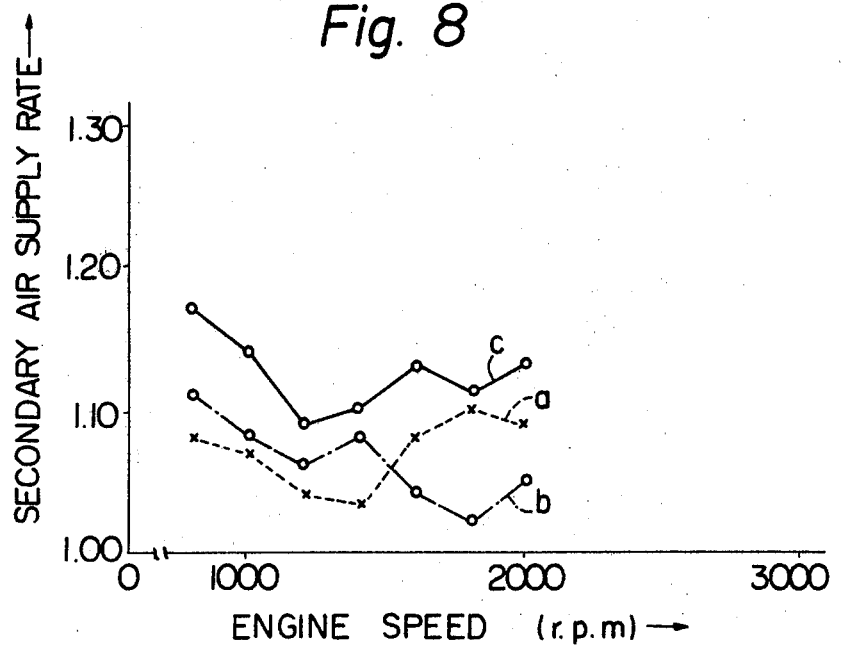
FIG. 8 is a graph showing the variation of the rate of secondary air supplied to the exhaust system of the engine of FIG. 5.

It will be understood that sufficient secondary air is supplied into the exhaust system of the engine by employing the above-mentioned two secondary air supply systems 34 and 42. Furthermore, the exhaust system can be supplied with an appropriate amount of the secondary air required for various engine operating conditions by using the two secondary air supply systems which have different air induction characteristics. In other words, since the amount of the secondayr air inducted into the exhaust system changes at the various engine operating conditions in accordance with the locations at which the secondary air injection nozzles open, the volumes of the secondary air passages 36 and 44, the characteristic-frequency of the one-way valves 38 and 46 etc., it is possible to increase the secondary air amount supplied to the exhaust system throughout various ranges of the engine operating conditions by using the two secondary air supply systems having different air induction characteristics. This will be illustrated with reference to FIG. 8 in which a dotted a and a dot-dash line b indicate air induction characteristics of the first and second secondary air supply systems 34 and 42, respectively; and a solid line c indicates the total characteristics of the first and second secondary air supply systems 34 and 42, which is obtained by adding the values of the dotted line a and the dot-dash line b. In FIG. 8, "secondary air supply rate" indicates the value, at no load engine operation, (1 + the amount of secondary air supplied to the exhaust system/the amount of the intake air inducted into the engine cylinders). It will be apparent from the graph in FIG. 8, that sufficient secondary air is stably supplied to the exhaust system of the engine throughout various engine operating ranges.

Figure 9:
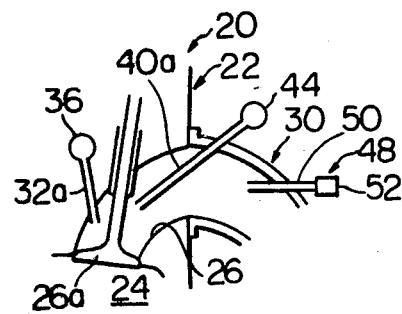
FIG. 9 is a schematic vertical section view of another preferred embodiment of an internal combustion engine in accordance with the present invention.
Figure 10:
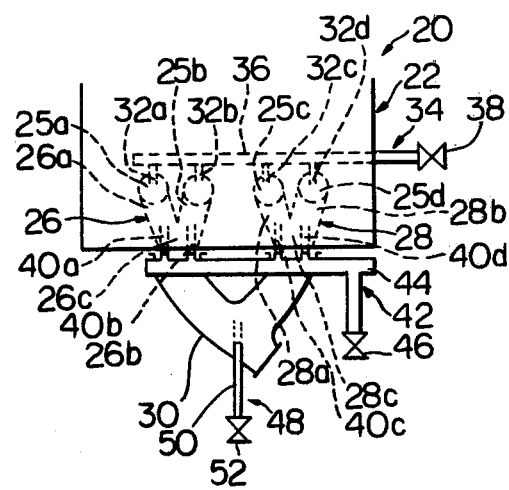
FIG. 10 is a schematic plan view of the engine of FIG. 9.

FIGS. 9 and 10 shows another preferred embodiment of the engine in accordance with the present invention, which is similar to the embodiment shown in FIG. 5 and 6 except for a third secondary air supply system or means 48 to supply the further secondary air into the exhaust manifold 30. As shown, the third secondary air supply system 48 is composed of a secondary air injection nozzle 50 and a one-way valve 52 connected to the injection nozzle 50. It will be seen that the one-way valve 52 is arranged to operate similarly to the one-way valve 38 of the first secondary air supply system 34.

Figure 11:
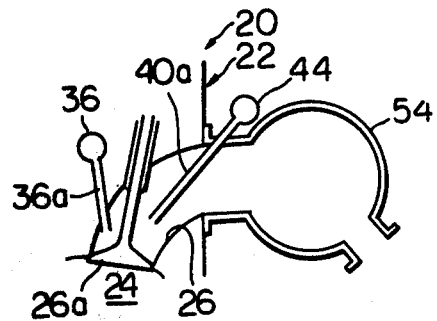
FIG. 11 is a schematic vertical section view of a further preferred embodiment of an internal combustion engine in accordance with the present invention.

FIG. 11 shows a further preferred embodiment of the engine according to the present invention which is similar to the embodiment shown in FIG. 5 with the exception that a thermal reactor 54 is installed, in place of the exhaust manifold 30, to burn the unburned constituents contained in the exhaust gases discharged from the combustion chambers through the siamesed exhaust ports 26 and 28.

What is claimed is:
1. An internal combustion engine comprising:
a cylinder head defining two combustion chambers, said cylinder head being formed with an exhaust port which has two upstream portions which are respectively connectable to the two combustion chambers, and a downstream portion connected to the two upstream portions and open to one side of said cylinder head;
a first secondary air supply means for supplying air to the two upstream portions of the exhaust port; and
a second secondary air supply means for supplying air to the exhaust port, said second secondary air supply means being different and separate from said first secondary air supply means.

2. An internal combustion engine as claimed in claim 1, in which said first secondary air supply means includes:
two air injection nozzles disposed open to the two upstream portions of the exhaust port of said cylinder head, respectively, to supply air thereinto;
an air passage means connected to said two air injection nozzles to introduce therethrough air into said two air injection nozzles; and
a one-way valve connected to said air passage means and arranged to open to induct therethrough air into said air passage means of said first secondary air supply means when the pressure in the exhaust port is below atmospheric pressure, and close to block communication between the atmospheric air and the inside of said air passage means when the pressure in in the exhaust port is above atmospheric pressure.

3. An internal combustion engine as claimed in claim 2, said second secondary air supply means includes:
two air injection nozzles disposed open into the exhaust port to supply air into the exhaust port;
an air passage means connected to said air injection nozzles of said second secondary air supply means to introduce therethrough the air into said two air injection nozzles of said second secondary air supply means; and
a one-way valve connected to said air passage means of said second secondary air supply means and arranged to open to induct therethrough air into said passage means of said second secondary air supply means when the pressure in the exhaust port is below atmospheric air, and close to block communication between atmospheric air and the inside of said air passage means of said second secondary air supply means when the pressure in the exhaust port is above atmospheric pressure.

4. An internal combustion engine as claimed in claim 3, in which said two air injection nozzles of said second secondary air supply means are disposed open into the two upstream portions of the exhaust port of said cylinder head, respectively.

5. An internal combustion engine as claimed in claim 4, in which said first and second secondary air supply means have different air induction characteristics for inducting air into the exhaust port.

6. An internal combustion engine as claimed in claim 5, in which the locations to which said two air injection nozzles of said first and second secondary air supply means are different from each other.

7. An internal combustion engine as claimed in claim 5, in which the volumes of said air passage means of said first and second secondary air supply means are different from each other.

8. An internal combustion engine as claimed in claim 5, in which the characteristic-frequencies of said one-way valves of said first and second secondary air supply means are different from each other.

9. An internal combustion engine as claimed in claim 3, further comprising an exhaust manifold connected to the downstream portion of the exhaust port of said cylinder head, in which the engine further comprises a third secondary air supply means including:

an air injection nozzle disposed open into the exhaust manifold of the engine; and a one-way valve connected to the air injection nozzle and arranged to open to induct therethrough air into the exhaust manifold through the air injection nozzle when the pressure below atmospheric pressure is generated in the exhaust manifold, and close to block communication between atmospheric air and the inside of the air injection nozzle when pressure above atmospheric pressure is generated in the exhaust manifold.

10. An internal combustion engine as claimed in claim 3, further comprising a thermal reactor for burning the unburned constituents contained in the exhaust gases discharged from the combustion chambers through the exhaust port, said thermal reactor being connected to the downstream portion of the exhaust port of said cylinder head.

* * * * *